United States Patent [19]

Palmer

[11] Patent Number: 4,763,510

[45] Date of Patent: Aug. 16, 1988

[54] PLUG MEMBER USED IN HYDRAULIC TESTING OF PLUMBING SYSTEM

[76] Inventor: Dennis D. Palmer, 1542 Owenwood Cir., Sandy, Utah 84092

[21] Appl. No.: 920,044

[22] Filed: Oct. 16, 1986

[51] Int. Cl.⁴ ............................................. G01M 3/28
[52] U.S. Cl. .................................. 73/40.5 R; 73/49.8; 138/90
[58] Field of Search ...................... 137/1; 138/90, 94; 73/40.5 R, 49.8, 49.5, 49.1

[56] References Cited

U.S. PATENT DOCUMENTS 1,572,507  2/1926  Robert ..................... 137/516.27 X
4,542,642  9/1985  Tagliarino ..................... 138/90 X
4,602,504  7/1986  Barber ................................. 73/49.8

Primary Examiner—Alan Cohan
Attorney, Agent, or Firm—Thorpe, North & Western

[57] ABSTRACT

A one-piece, molded sealing element which is installed in a test tee on a drain, vent, waste plumbing system. The sealing element is cup-shaped and fits within the test tee to dam water on the upstream side of the test tee for hydraulic testing of the plumbing system. The sealing element can be broken and removed from the test tee through the lateral opening in the tee following the hydraulic test of the plumbing system.

3 Claims, 1 Drawing Sheet

PLUG MEMBER USED IN HYDRAULIC TESTING OF PLUMBING SYSTEM

BACKGROUND OF THE INVENTION

1. Field

The present invention relates to devices which are used to dam or block the drain, vent, waste plumbing systems above the test tee, such that the system can be filled with air or water to hydraulically test the system.

2. State of the Art

When a plumber installs a drain, vent, waste system in either new construction or in remodeling, a test tee is installed in the low point of the drain, vent, waste system. When the drain, vent, waste system is completed, it must be tested hydraulically to insure the absence of leaks in the system. To accomplish the hydraulic test, the plumbing system must be blocked or dammed at the test tee so that the system can be filled with water above the test tee.

Heretofore, it has been common practice to utilize an inflatable rubber or elastomeric device which can be installed through the lateral opening in the tee to block the plumbing system above the tee. Once installed above the lateral opening in the test tee, the block-off device is inflated so as to make a fluid tight seal with the plumbing system at the test tee. Water is then introduced into the plumbing system and allowed to stand in the plumbing system above the test tee to determine if there are any leaks in the system.

Following the test, the inflatable device must be removed to allow the water to drain from the system. The system normally contains a substantial volume of water under a substantial head or pressure. In deflating the damming device, care must be taken to prevent the device from being swept into the drain conduit downstream from the test tee. Otherwise, the device is likely to be caught in the drainage conduit and must then be removed. To alleviate the chance of having the damming device being swept deep into the drain conduit, a tether is commonly attached to the device. If the device is swept into the drainage conduit, the tether holds the device close to the test tee and after the water has drained from the plumbing system being tested, the tether is used to withdraw the damming device from the drainage conduit through the test tee.

Unfortunately, it has been the sad experience of many plumbers to have the tether break as the damming device is being swept into the drainage conduit by the head pressure of the water in the system being tested. Alternatively, and just as perplexing, the tether can become entangled with the damming device in the drainage conduit such that even though the tether extends out of the test tee, the damming device cannot be extracted from the drainage conduit.

Further, the inflatable damming devices are relatively expensive and must be replaced rather frequently. It would be highly desirable to provide a simple, inexpensive device for blocking or damming the plumbing system at the test tee, wherein the water can readily be released through the device following the hydraulic testing and further wherein the damming device cannot be swept into the drainage conduit below the test tee.

3. Objectives

A principal objective of the present invention is to provide an inexpensive, foolproof device which is easily and readily installed in the test tee as the plumbing system is being fabricated, wherein the device blocks or dams the plumbing system above the test tee, and wherein following the test, the water in the tested system can be drained through the blocking device while the device remains in place within the test tee so as to positively prevent the blocking device from being swept into the drainage conduit below the test tee.

A particular objective of the present invention is to provide a shallow, cup-shaped sealing element molded integrally from a polymeric material, wherein the cup-shaped element is adapted to be installed in the straight through barrell of a plastic test tee just above the lateral opening in the test tee.

An additional objective is to provide a cup-shaped element as in the above paragraph comprising a circular disc bottom which is integrally molded to an upstanding cylindrical sidewall, with a break away groove being molded between the sidewall and the disc bottom such that following the hydraulic test of the plumbing system, the disc bottom can be readily broken away from the sidewall for easy removal of the disc bottom portion and sidewall portion separately from the test tee.

A further objective is to provide a cup-shaped element of the type as in the above paragraph, wherein an elongate prong is formed integrally with and extends downwardly from the disc bottom, whereby the prong can be used to break an initial opening in the disc bottom to allow water to drain therethrough from above the disc element while the disc element and the sidewall of the cup-shaped element remain fixed in place in the test tee.

SUMMARY OF THE INVENTION

The above objectives are achieved in accordance with the present invention by providing a novel, shallow cup-shaped, sealing element which is molded as an integral, unitary piece from a polymeric material. The molded sealing element is adapted to be inserted snugly within the straight through barrel of a plastic test tee so that the sealing element forms a blockage which seals around the barrel of the plastic tee, whereby hydraulic testing of the plumbing system upstream of the test tee can be accomplished. The molded sealing element is inexpensive, easy to use and completely eliminates the possibility of flushing the sealing element down the drainage conduit. Further, the molded sealing element of the present invention provides a means for safely and controllably releasing the test water upstream from the test tee with the sealing element in place and without having the water splash out of the test tee on the floor and all over the plumber. Once the test water has been drained, the molded sealing element is broken into two parts and quickly removed from the test tee.

In the preferred embodiment, the molded sealing element has a shallow, cup-shape comprising an essentially flat circular disc bottom. An upstanding cylindrical sidewall extends upwardly from the perimeter of the disc, and an angled flange extends outwardly and upwardly from the upper end of the cylindrical sidewall. The cup-shaped sealing element is adapted to fit snugly within the straight through barrel of the plastic tee, with the cylindrical sidewall coaxially received in the barrel of the plastic tee and with the flange on the cylindrical sidewall mating with and lying flatwise against the bevel in the barrel of the plastic tee.

In use, the cup-shaped, sealing element is lightly glued in place in the test tee, and the drain, vent, waste system is fabricated above the test tee. To hydraulically test the drain, vent, waste system, the system is filled with water above the test tee. The cup-shaped sealing element blocks and seals the plumbing system at the test tee so that the water remains in the system above the test tee. Following the hydraulic test, a hole is created in the disc bottom of the cup-shaped sealing element. The disc bottom is accessible through the lateral opening of the test tee.

After the water has drained from the system through the hole in the disc bottom, the disc bottom itself is broken away from the cylindrical sidewall portion of the cup-shaped sealing element. To facilitate the breaking away of the disc bottom, a groove is advantageously formed in the molded polymeric material, with the groove being located around the perimeter of the disc bottom and between the disc bottom and the cylindrical sidewall. The disc bottom is thus joined to the cylindrical sidewall by a relatively thin section at the groove. A screwdriver is readily pushed through the sidewall of the cup-shaped sealing element through the lateral opening in the test tee, with the screwdriver then being pivoted against the disc bottom to break the disc bottom from the cylindrical side wall. The separated disc bottom is removed from the lateral opening in the test tee leaving the cylindrical sidewall in the test tee. The screwdriver is then wedged between the cylindrical sidewall and the internal surface of the barrel of the test tee. With the disc bottom having been removed, it is relatively easy to force the cylindrical sidewall inwardly and break it away from the internal surface of the barrel of the test tee. The broken away cylindrical sidewall is then removed from the test tee leaving no part of the sealing element in the test tee. A plug or cover is provided for the lateral opening in the test tee, and the drain vent waste system is ready for use.

Additional objects and features of the invention will become apparent from the following detailed description taken together with the accompanying drawings.

THE DRAWINGS

A preferred embodiment of the present invention representing the best mode presently contemplated of carrying out the invention is illustrated in the accompanying drawings, in which.

Figure 1:
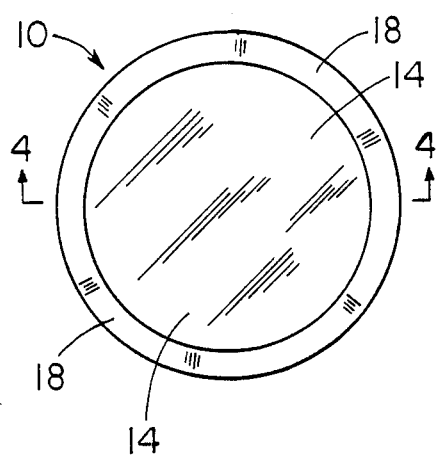
FIG. 1 is a top view of a preferred embodiment of a shallow, cup-shaped, sealing element in accordance with the present invention.
Figure 5:
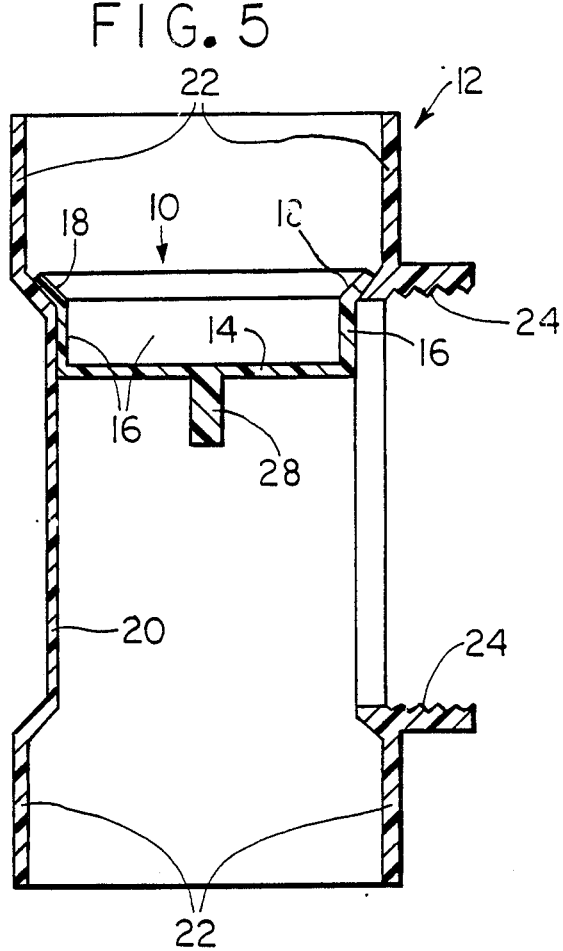
Figure 2:
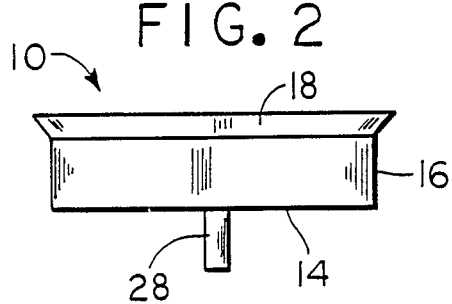
FIG. 2 is an elevational view of the sealing element of FIG. 1.
Figure 3:
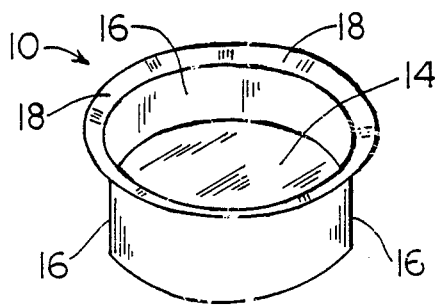
FIG. 3 is a pictorial view of the sealing element of FIG. 1.
Figure 4:
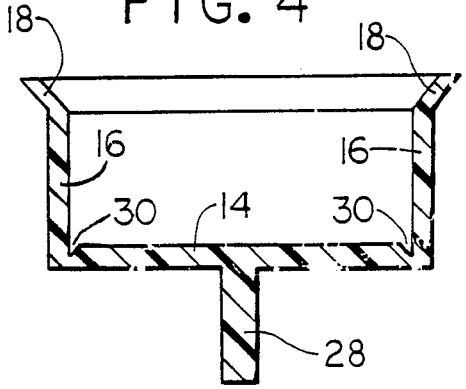

FIG. 4 is a vertical cross section taken along line 4-4 of FIG. 1, with FIG. 4 being drawn to a different scale to show detail of the groove between the bottom and the cylindrical side wall of the element; and FIG. 5 is a vertical cross section through a standard, plastic test tee as commercially available in the plumbing trade, with the sealing element of the present invention positioned in its proper operating location within the test tee.

DETAILED DESCRIPTION OF THE ILLUSTRATED EMBODIMENT

A novel, shallow cup-shaped sealing element in accordance with the invention is shown generally by the reference number 10 in the drawings. The sealing element 10 is adapted to be used with conventional plastic test tees 12 as shown in FIG. 5. The test tee 12, although not shown in the drawings, is incorporated in the low position in a drain, vent, waste plumbing system, and the sealing element 10, as will be further discussed hereinafter, is used for hydraulic testing of the drain, vent, waste plumbing system.

Referring to the drawings in general, the cup-shaped, sealing element comprises a circular disc bottom 14, an upstanding, cylindrical, sidewall 16 and an angled flange 18. The bottom 14, sidewall 16 and flange 18 are molded as a unitary single unit from an appropriate polymeric material, such as nylon, polyethylene, polypropylene, acrylonitrile, butadiene, styrene, vinyl polymers and other numerous polymers and copolymers available in the plastics industry. The cylindrical sidewall 16 extends upwardly from the perimeter of the disc bottom 14, and the angled flange 18 extends outwardly and upwardly from the upper end of the cylindrical sidewall 16.

As best shown in FIG. 5, the cup-shaped, sealing element 10 fits snugly within the straight through barrel 20 of a conventional plastic, test tee. Such test tees 12 have a bevel adjacent each end of the straight through barrel 20, with an enlarged nipple 22 extending coaxially with the barrel 20. The nipples 22 are adapted to receive standard plastic pipe, with the drain, vent, waste system being fabricated upstream from the test tee 12 and with the sewer drain being connected to the downstream side of the test tee 12. The lateral opening in the test tee 12 is threaded as shown by reference number 24. The lateral opening 24 provides access to the drain, vent, waste system for cleaning and testing. When in actual use, a threaded plug is engaged in the lateral opening to close that opening.

When the cup-shaped element 10 is positioned within the test tee 12, the cylindrical sidewall 16 is received coaxially in the barrel 20 of the test tee 12, with the flange 18 on the cup-shaped element 10 mating with and lying flatwise against the bevel in the barrel of the plastic tee 12. The flange 18 is preferably lightly glued to the bevel of the test tee 12 to form a water tight seal.

In using the cup-shaped sealing element 10 of the present invention in the hydraulic testing of a drain, vent, waste plumbing system, the sealing element 10 is installed in the upstream end of a test tee 12 as shown in FIG. 5. The test tee 12 is then installed in a drain, vent, waste plumbing system, with the test tee being at the low point of the drain, vent, waste system, and with the downstream end of the test tee 10 being connected to the sewer system.

The cup-shaped sealing element 10 blocks off and seals the upstream plumbing system, and the upstream system is filled with water to hydraulically test the drain, vent, waste system. After the plumbing system has been tested, water is released from the system by breaking a drain hole in the bottom of the cup-shaped sealing element. This is conveniently done by breaking a hole in the bottom disc 14 of the cup-shaped sealing element 10. The bottom disc 14 is accessible through the lateral opening in the test tee 12. To aid in the breaking of a hole in the bottom disc 12, an elongate prong 28 is formed integrally with and extends downwardly from the bottom of the bottom disc 14. One can either reach in through the lateral opening with his fingers or an appropriate tool such as plyers or a screwdriver to break the prong 28 from the bottom disc 14. When the prong is bent sidewards, it will break from the bottom disc 14 and in the process break a hole in the bottom disc 14.

After the water has drained through the hole in the bottom disc 14, the cup-shaped element is then removed. First, the bottom disc 14 is broken from the cylindrical sidewall 16, and the separated bottom disc 14 is removed from the side entry or lateral opening in the test tee 12. To aid in the breaking away of the bottom disc 14, a groove 30 (see FIG. 4) is formed in the polymeric material from which the sealing element 10 is molded, with the groove 30 being located around the perimeter of the bottom disc 14 and between the bottom disc 14 and the cylindrical sidewall 16. Thus, the bottom disc 14 is joined to the cylindrical sidewall 16 by a relatively thin section at the groove 30. The bottom disc 14 is easily popped from the cylindrical sidewall 16 by forcing a screwdriver through the portion of the sidewall 16 which is exposed through the lateral opening in the test tee 12. Once forced through the sidewall 16, the screwdriver is used to pry down on the bottom disc 14 from its upper side to break the disc from the cylindrical sidewall 16.

After the bottom disc 14 has been popped from the cylindrical sidewall 16 and removed from the test tee 12, the remainder of the cup-shaped element 10 can be removed. To do this, a screwdriver is used to pry the remaining cylindrical sidewall 16 and flange 18 from the barrel of the plastic test tee 12. The screwdriver is force up between the flange 18 and the test tee 12 at a point adjacent to the lateral opening in the test tee 12, and the screwdriver is then used to pry the remaining portion of the sidewall 14 and flange 16 from the test tee 12. The piece comprising the sidewall 14 and flange 16, which has been broken free of the barrel of the test tee 12, is then removed from the test tee 12 through the lateral opening therein. Once this is done, there is nothing remaining of the cup-shaped sealing element 10 within the test tee 12, and the lateral opening is closed by threading a plug therein. The plumbing system is then ready for normal use.

Although a preferred embodiment of the device has been illustrated and described, it is to be understood that the present disclosure is made by way of example and that various other embodiments are possible without departing from the subject matter comping within the scope of the following claims, which subject matter is regarded as the invention.

I claim:

1. A method of hydraulically testing a drain, vent, waste plumbing system comprising the steps of
   (a) installing a shallow, cup-shaped, sealing element, comprising a circular disc, an upstanding, cylindrical sidewall extending upwardly from the perimeter of the disc and an angled flange extending outwardly and upwardly from the upper end of said cylindrical sidewall, in the upstream end of the straight through barrel of a plastic tee, such that the cylindrical sidewall of said cup-shaped, sealing element is coaxially received in the barrel of the plastic tee and the flange on said cup-shaped, sealing element mates with and lies flatwise against the bevel in the barrel of the plastic tee;
   (b) installing the plastic tee of step (a) into the draing, vent, waste plumbing system;
   (c) filling the drain, vent, waste plumbing system upstream of the plastic tee which contains the sealing element to hydraulically test the drain, vent, waste plumbing system;
   (d) breaking a hole in the bottom of the sealing element to release the water in the drain, vent, waste plumbing system;
   (e) breaking the disc from the cylindrical sidewall of the sealing element and removing the disc from the side entry of said plastic tee; and
   (f) prying the remaining cylindrical sidewall and flange of said sealing element from the barrel of said plastic tee and removing said cylindrical sidewall and flange from the side entry of said plastic tee.

2. A method in accordance with claim 1, wherein a groove is formed in the polymeric material from which said sealing element is molded, said groove being located around the perimeter of said disc between said disc and said cylindrical sidewall so that the disc is joined to the cylindrical sidewall by a relatively thin section at the groove, whereby the thin section facilitates breaking the disc from the cylindrical sidewall in step (e).

3. A method in accordance with claim 2, wherein breaking of the hole in step (d) is accomplished by breaking the prong from the bottom of said disc.

* * * * *